(12) United States Patent
Domec et al.

(10) Patent No.: US 8,455,793 B2
(45) Date of Patent: Jun. 4, 2013

(54) LASER SHOCK PEENING

(75) Inventors: Brennan S. Domec, Lafayette, LA (US); Pradeep Kumar Mallenahalli, Broussard, LA (US); John Fletcher Wheeler, Aberdeen (GB)

(73) Assignee: Frank's International, Inc., Houston, TX (US)

(*) Notice: Subject to any disclaimer, the term of this patent is extended or adjusted under 35 U.S.C. 154(b) by 1030 days.

(21) Appl. No.: 12/402,251

(22) Filed: Mar. 11, 2009

(65) Prior Publication Data
US 2009/0230104 A1 Sep. 17, 2009

Related U.S. Application Data

(60) Provisional application No. 61/035,647, filed on Mar. 11, 2008, provisional application No. 61/056,909, filed on May 29, 2008.

(51) Int. Cl.
*B23K 26/08* (2006.01)
*B23K 26/02* (2006.01)

(52) U.S. Cl.
USPC .................. 219/121.78; 219/121.82

(58) Field of Classification Search
USPC ............ 219/121.78, 121.82, 121.85, 121.79, 219/121.8, 121.81; 148/565
See application file for complete search history.

(56) References Cited

U.S. PATENT DOCUMENTS

| | | | |
|---|---|---|---|
| 3,056,155 A | 10/1962 | Harmes | |
| 5,744,781 A | 4/1998 | Yeaton | |
| 5,977,515 A * | 11/1999 | Uraki et al. | 219/121.84 |
| 6,215,097 B1 | 4/2001 | Mannava | |
| 6,288,358 B1 | 9/2001 | Dulaney et al. | |
| 6,437,285 B1 * | 8/2002 | Thomas et al. | 219/121.75 |
| 6,528,763 B1 | 3/2003 | Lahrman et al. | |
| 6,805,970 B2 | 10/2004 | Hackel et al. | |
| 6,867,390 B2 | 3/2005 | Clauer et al. | |
| 7,022,938 B2 * | 4/2006 | Tamura et al. | 219/121.64 |
| 7,057,134 B2 * | 6/2006 | Denney et al. | 219/121.78 |
| 7,270,021 B2 * | 9/2007 | Shimamura et al. | 73/865.8 |
| 7,510,219 B2 * | 3/2009 | Huston | 285/333 |
| 2003/0029845 A1 | 2/2003 | Tamura | |
| 2006/0102609 A1 | 5/2006 | Dane | |
| 2006/0222138 A1 | 10/2006 | Shimamura | |
| 2008/0032152 A1 | 2/2008 | Vaughn et al. | |
| 2008/0032153 A1 | 2/2008 | Vaughn et al. | |

OTHER PUBLICATIONS

PCT/US2009/036821; International Search Report and Written Opinion mailed Nov. 2, 2009.

\* cited by examiner

*Primary Examiner* — Sang Paik
(74) *Attorney, Agent, or Firm* — Winstead PC; Henry L Ehrlich

(57) ABSTRACT

An embodiment of an apparatus for laser shock peening a treatment region of a metallic member includes a base oriented along a longitudinal axis; an engagement member actuable to engage a surface of the metallic member, the base in connection with engagement member; and a laser peening head adapted to emit laser radiation disposed with the base, the laser peening head moveable relative to the longitudinal axis.

24 Claims, 1 Drawing Sheet

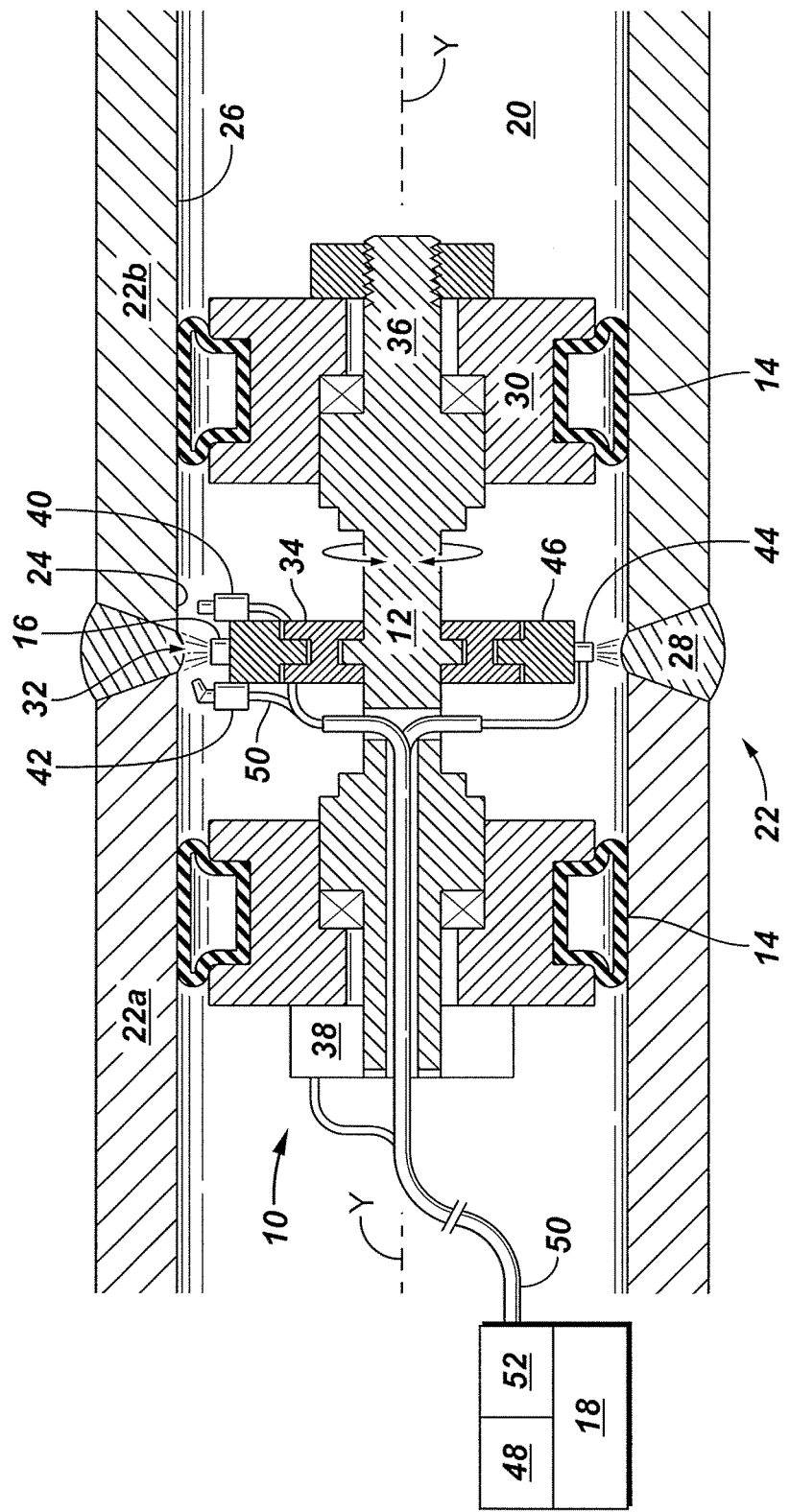

LASER SHOCK PEENING

RELATED APPLICATIONS

This application claims the benefit of U.S. Provisional Patent Application No. 61/035,647 filed Mar. 11, 2008, and U.S. Provisional Patent Application No. 61/056,909 filed May 29, 2008.

FIELD

An apparatus and process for treating tubular goods and the resulting treated oilfield tubular goods are discussed herein.

BACKGROUND

Tubular segments are often joined together to form tubular strings for use in oilfield applications. Tubular strings tend to require high strength and fatigue resistance as well as high fracture toughness. Strength is the maximum amount of stress a component can withstand without failure. Fatigue resistance is the ability of a component to resist fatigue failure, for example crack propagation. Fracture toughness is the resistance to failure from a fracture originating from a preexisting crack. Other desirable properties include fatigue resistance, strength, fracture toughness, fatigue life, corrosion resistance, hardness, resistance to weld cracking, and/or anti-galling ability.

Tubulars for oilfield applications are typically joined in situ. For example, a tubular string may be joined at a wellhead that is in the vicinity of the entrance to a well. The well has a borehole extending into a formation. The tubular string is lowered through a rig floor into the borehole and suspended at the rig floor using a suspending device, such as a spider. The proximal end of the pipe string is positioned above the suspending device to facilitate the joining of additional tubular segments to the tubular string, after which the lengthened tubular string is lowered further through the rig floor. This process is repeated until the tubular string reaches the desired length for being installed in the borehole.

A joining process for tubular strings may be a mechanical joining process, a metallurgical joining process, or a combination of any suitable processes. For example, in one type of mechanical joining process tubular segments are threadedly connected. The ends of a pair of the tubular segments to be joined are equipped with threads. Although threading is one type of joining process, there has been interest in other alternatives, such as welding.

Welding is an example of a metallurgical joining process. Welding tubular segments involves bringing the ends of a pair of tubular segments to be joined into contact or proximity and applying or creating heat. Through the welding process the heated ends are joined. Some types of welding processes, but not all, involve a filler material that assists in the weld and is incorporated in the joint.

A joining process, such as welding, can result in tensile residual stresses in the joined component. Tensile stress is stress that causes two regions of a component on either side of a plane dividing the two regions to elongate. These tensile residual stresses are capable of reducing desirable properties, such as fatigue resistance, strength, fracture toughness, fatigue life, corrosion resistance, hardness, resistance to weld cracking, and/or anti-galling ability. Fatigue life describes the number of cycles at which a component fails under cyclic loading. Examples of strength are tensile strength and yield strength. Tensile strength is the ability to withstand tensile stress. Yield strength is the maximum stress a component can withstand without deforming permanently.

Laser shock peening is a known technique for inducing compressive stress in a work piece. Compressive stress is the opposite of tensile stress. That is, it is stress that causes two regions of a component on either side of a plane dividing the regions to contract. Laser shock peening is also termed herein laser peening. Laser peening relies on the production and propagation of a shockwave to generate plastic deformation of a work piece. During laser peening, an opaque overlay material may be applied to the region designated to be laser peened. The opaque overlay material serves as an ablative material. A second, transparent overlay material, generally water, is allowed to flow over the designated region. The transparent overlay material serves as a confinement material. The designations of opaque and transparent refer to opacity and transparency with respect to the coherent laser radiation. For example, coherent radiation from a neodymium laser with water as the transparent material and black paint as the opaque material may be used in a laser peening process.

Once the laser peening process has begun, a pulse of coherent laser radiation is allowed to pass through the transparent overlay and rapidly vaporizes at least a portion of the opaque overlay, or at least a portion of the base material if the opaque overlay is omitted, as it absorbs the radiation. The vaporization creates a high pressure, rapidly expanding plasma which is confined by the transparent overlay material. This confinement of the plasma, known as a confined ablation mode, causes the high pressure shockwave to propagate through the material. Plastic deformation results if the pressure of the shockwave exceeds the dynamic yield strength of the material. Compressive residual stresses directly proportionate to the degree of deformation may be readily achieved.

Tensile residual stresses introduced by tubular joining processes are located proximate to the joint between adjacent tubular segments. Tubular segments, typically 30 ft. to 60 ft. (9.1 m to 18.3 m) in length, can be joined together to form a tubular string up to 10,000 ft. (3,048 m) or more. Thus a joint region may be located a distance of 30 ft. or greater from the open end of the tubular string.

SUMMARY

An embodiment of an apparatus for laser shock peening a treatment region of a metallic member includes a base oriented along a longitudinal axis; an engagement member actuable to engage a surface of the metallic member, the base in connection with engagement member; and a laser peening head adapted to emit laser radiation disposed with the base, the laser peening head moveable relative to the longitudinal axis.

An embodiment of an apparatus for laser shock peening a tubular from the bore of the tubular includes a base oriented along a longitudinal axis; opposing engagement members spaced apart by the base, the engagement members radially expandable to selectively engage an inner surface of the tubular; a laser peening head adapted to emit laser radiation disposed with the base, the laser peening head moveable relative to the longitudinal axis; an opaque overlay applicator disposed with the base; and a transparent overlay applicator disposed with the base.

An embodiment of a method for laser shock peening a tubular includes the steps of providing a laser peening apparatus having a laser peening head; disposing the laser peening apparatus into a bore of the tubular; positioning the laser peening head proximate to an inner surface of the tubular corresponding to a treatment region; and emitting laser radiation from the laser peening head directed at the treatment region.

The foregoing has outlined some of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein:

FIG. 1 is an elevation view of a laser shock peening apparatus according to an exemplary embodiment of the invention disposed in a bore of tubular.

DETAILED DESCRIPTION

Refer now to the drawings wherein depicted elements are not necessarily shown to scale and wherein like or similar elements are designated by the same reference numeral through the several views.

Various embodiments of apparatuses and processes for using coherent laser radiation on tubulars are disclosed. The coherent laser radiation is provided via laser shock peening apparatuses and methods. The illustrated apparatus is described in relation to laser peening a tubular, and in particular, to laser peening a tubular from the internal bore of the tubular. However, it should be realized that the apparatuses and methods may be utilized in regard to non-tubular members as well as to the exterior of tubulars.

Laser peening apparatuses are disclosed that are capable of being inserted into and removed from the bore of a tubular. Tubular may be used herein to designate a single continuous length of a tubular, also referred to as a segment or the like, as well as one or more tubular segments that are joined together. The apparatus may be adapted to radially control the position of a laser peening head at a desired distance from the tubular surface. The apparatuses may rotate a laser peening head with respect to the tubular. When an opaque overlay material is used, the apparatus may be adapted to apply the opaque overlay material onto the inner surface of the tubular ahead of the coherent laser radiation emitted from the laser peening head. The apparatuses are portable, which is facilitated by the size and structure of the apparatuses.

The laser peening process may include any one or more of inducing compressive stress and relieving tensile stress. The laser peening process may increase any one or more of fatigue resistance, fracture toughness, fatigue life, strength, tensile strength, yield strength, corrosion resistance, hardness, resistance to weld cracking, and anti-galling ability. The laser peening process may occur in any area of a tubular, such as and without limitation proximate to joint region, proximate to a cutting region, and the like. It will be understood that while embodiments of are described with reference to a treatment region being proximate to a joint region, the present apparatuses and processes a not limited to application proximate to joint regions.

Refer now to FIG. 1, wherein an elevation view of an apparatus, generally denoted by the numeral 10, for laser shock peening (LSP) according to an exemplary embodiment of the present invention is provided. The illustrated embodiment of apparatus 10 includes a base 12, opposing engagement members 14 and a laser peening head 16. Laser peening head 16 includes, or is operationally connected to, a laser 18 to emit laser radiation. Base 12 is illustrated extending between opposing engagement members 14.

Apparatus 10 is adapted to be inserted within the bore 20 of a tubular 22 to laser peen a treatment region 24. Engagement members 14 may be actuated to engage inner surface 26 of tubular 22 to secure apparatus 10 within tubular 22. Laser peening head 16 may be rotated about the circumference of inner surface 26 of tubular 22, laser peening a treatment region 24 circumferentially along inner surface 26. Laser peening head 16 may be moved axially relative to tubular 22 for positioning, and/or while laser peening to provide a helically treated path.

Tubular 22 may include one or more tubular elements 25a, 25b. In the illustrated embodiment, tubular 22 includes a first tubular 25a and a second tubular 25b interconnected at joint 28. Joint 28 is illustrated as a weld joint in the embodiment of FIG. 1. Tubular 22 may be an oilfield tubular, such as and without limitation, steel catenary risers (SCR), top tension risers (TTR), tendons, caissons, stress joints (SJ), pipeline end terminations (PLET), pipeline end manifold (PLEM), off-loading risers (OLR), flowlines (FL), flanges, elbows, coiled tubing, reeled tubulars, completion tubing, casing, liners, and expandable tubulars. As used herein, the numerical value of the inner diameter distance is the orbitally averaged distance between opposing inner surfaces of tubular 22 in a plane substantially perpendicular to the surfaces.

In some embodiments, tubular 22 or at least a segment of tubular 22 may be composed of steel. It will be understood that any suitable type steels may be utilized, such as ASTM A707, AISI 4130, AISI 4140, OCTG grades, line pipe grades, microalloyed steel, and the like. In some embodiments, more than one laser shock peened region may be present and treatment regions 24 may overlap.

Treatment region 24 may proximate to joint 28 formed by a joining process, such as a welding, threading etc. Treatment region 24 may be positioned 30 feet or more from an opening (e.g., an end) into tubular 22. Embodiments of apparatus 10 may provide the ability to laser peen inner surface 26 of tubular 22 with a length to diameter ratio greater than 2. Thus, treatment region 24 may be within tubular 22 that has a length to diameter ratio greater than 2.

Treatment region 24 may include an area of a welded tubular containing all effects of the welding process extending from the interface of the heat affected zone (HAZ) with the (non-affected) base metal to the same of the opposite side of joint 28. A heat affected zone is an area of base metal affected by the welding. Treatment region 24 may include one or more of a weld bead and a weld bevel. When the weld is a fusion weld, the weld bead is an area of a component formed by deposited weld metal. A weld bead can be further defined as the volume of material between a pair of fusion lines on either side of the weld joint and the root and cap of the deposited weld metal. A weld bevel is an end preparation of the components to be welded. Examples of weld bevels may include chamfered edge (standard bevel) and a "J" bevel. A joint region may result from a mechanical or metallurgical joining process. In FIG. 1, the joint 28 is illustrated as having a transverse weld joint. However, it should be recognized that apparatus 10 may be utilized to laser peen a treatment region 24 along a longitudinal joint.

It is understood that joint 28 is illustrative of a treatment region 24 of a tubular 22. Other treatment regions 24 may include, without limitation, a bend in the tubular, a cutting region, and other regions of a tubular. Treatment region 24 may be a region benefiting from any one or more of inducing compressive stress, relieving tensile stress, and increasing any one or more of fatigue resistance, fracture toughness, fatigue life, strength, tensile strength, yield strength, corrosion resistance, hardness, resistance to weld cracking, and anti-galling ability.

In the illustrated embodiment, engagement members 14 are inflatable members (e.g., hydraulic and/or pneumatic bladders) that can be inflated from an initial or insert position radially outward to engage the inner surface 26 of tubular 22. In the illustrated embodiment, engagement members 14 are disposed with supports 30. Inflatable engagement members 14 may form a seal substantially along the circumference inner surface 26 of tubular 22 when expanded. Thus, engagement members 14 may be utilized to contain or block the laser radiation, purge gas, inertial damping fluids, ablative materials, and the like.

Engagement members 14 may include inflatable members, mechanical devices such as slips, jaw, radially moveable pads, and the like. It is possible that some engagement members may mark the pipe. Thus, it may be desired to utilize a sealing member at the opposing ends of apparatus 10 to contain the laser radiation, purge gas, inertial damping fluids, ablative materials, and the like.

Laser peening head 16 is operationally connected to base 12 and positionable proximate to a treatment region 24. Laser peening head 16, may be moveable relative to base 12 so as to be properly positioned relative to treatment region 24. Properly positioned includes being oriented such that the radiation, or beam 32, emitted by laser peening head 16 is directed at the selected treatment region 24 and that laser peening head 16 is disposed at the required distance from treatment region 24. Laser peening head 16 may also be moveable so as to be disposed in an initial or insert position facilitating the insertion or apparatus 10 into bore 20 of tubular 22. In the illustrated embodiment, laser peening head 16 is connected to base 12 via an arm 34. In this embodiment, arm 34 is an articulating arm providing radial movement relative to base 12. Arm 34 may provide movement in one or more axial, radial and angular directions.

Base 12 may be an elongated member oriented along a longitudinal axis Y of apparatus 10. Base 12 may be adapted to rotate around longitudinal axis Y, such that when engagement members 14 are actuated to engage tubular 22 and secure apparatus 10 in a stationary position, base 12 may rotate laser peening head 16 around longitudinal axis Y. In some embodiments, laser peening head 16 may be functionally connected to base 12 in a manner so as to rotate relative to base 12. In the embodiment of FIG. 1, base 12 includes a shaft 36.

In the illustrated embodiment, a driver 38 (e.g., motor, actuator, etc.) is operationally connected to shaft 36 and base 12 to provide the rotational movement of base 12 and laser peening head 16. In some embodiments, laser peening head 16 may move axially along base 12. For example, base 12 and or shaft 36 may be arranged in an acme screw fashion. As understood, various configurations of may be utilized such that laser peening head is rotationally moveable around longitudinal axis Y and/or axially moveable along longitudinal axis Y. For example, in some embodiments, apparatus 10 may move axially in tubular 22 while laser peening the treatment region.

In the illustrated embodiment, apparatus 10 includes a sensor 40 disposed proximate to laser peening head 16. Sensor 40 may be oriented along the same path as laser peening head 16. Sensor 40 may include one or more sensing, measurement and visual devices to position laser peening head 16 relative to treatment region 24 and or monitor the laser peening process. In one example, sensor 40 may provide distance data relative to laser peening head 16 and treatment region 24.

Sensor 40 may include, but is not limited to, RADAR, LIDAR, video camera, still camera, 3D LASER scanner, coordinate measuring machine (CMM), non-contact sensors, contact sensors, and the like. Exemplary non-contact sensors are variable reluctance, eddy current, capacitive, ultrasonic (e.g., time of flight measurement), optical (e.g., optical fibers), interferometry, triangulation, laser telemeter, retroreflective, shadow principle and inductive. Exemplary contact sensors are linear variable differential transformer (LVDT), variable inductance, variable reluctance, potentiometer (e.g., conductive plastic, wire wound, and hybrid), magnetoresistive effect, strain gauge extensometer, glass scale encoder, potentiometer and wire encoder.

Apparatus 10 may further include a transparent overlay applicator 42 and/or an opaque overlay applicator 44. Applicators 42, 44 may be moveable relative to base 12 for positioning proximate to treatment region 24. In the illustrated embodiment of FIG. 1, transparent overlay applicator 42 is disposed with laser peening head 16 from articulating arm 34. Opaque overlay applicator 44 is disposed from base 12 via a second arm 46, which is an articulating arm in the illustrated embodiment. In this embodiment, arm 46 is disposed from base 12 approximately 180 degrees from arm 34.

In some embodiments, opaque overlay application 44 may apply an ablative coating to tubular 22, such as black paint. Transparent overlay applicator 42 may apply a translucent coating to tubular 22, such as water. Laser peening head 16 provides a pulse of coherent laser radiation that passes through the translucent coating applied to tubular 22 and vaporizes the ablative coating. This creates a high pressure shockwave that exerts compressive stress on tubular 22.

In some embodiments, transparent overlay applicator 42 may be omitted from apparatus 10. For example, when laser peening a suitable metal, laser shock peening can be operated without transparent overlap applicator 42. In some embodiments, opaque overlay applicator 44 may be omitted from apparatus 10 in some embodiments. For example, when laser peening a suitable metal, laser shock peening can be operated without opaque overlap applicator 44.

Arms 34, 46 may be capable of positioning a free end of the respective arm into a position relative to inner surface 26 of tubular 22. Arms 34, 46, may include, without limitation, include robotic arms with multiple degrees of freedom, simple linear actuators, and the like. A linear actuator may be a pneumatic or hydraulic cylinder, or electric device, that moves ends of arms 34, 46 relative to base 12. Articulating arm 34 is illustrative of a remote end, also termed herein a support. Remote end herein denotes that the support for laser peening head 16 is contained in a portable laser peening apparatus.

Apparatus 10 may be operationally connected to a power source, generally denoted by the numeral 48. Apparatus 10 is shown connected to power source 48 via cable 50, which may be an umbilical including one or more power and/or communication lines or conduits. Power source 48 may be positioned locally with apparatus 10 or distally positioned. Power source 48 may be any suitable power supply, including without limitation, electrical, hydraulic and pneumatic power. Cable 50 may include, but is not limited to, optic fibers, electric cables, wiring, and fluid conduits.

Apparatus 10 may be operationally connected to a processing system, referred to as a controller 52 herein. Controller 52 may be operationally connected to the devices of apparatus 10 (e.g., laser peening head 16, articulating arms 34 and 46, driver 38, applicators 42 and 44, engagement members 14, etc.) wirelessly and/or via hardwiring. Controller 52 is illustrated as connected to apparatus 10 via cable 50. Controller 52 may specify and/or control the laser power density and the laser pulse duration.

Apparatus 10 (e.g., controller 52) may include a real-time, closed-loop feedback system. Depending upon the output (e.g., resistance, voltage, etc.) of sensor 40, the signal may be fed into a signal conditioner (e.g., an amplifier and/or Wheatstone bridge) before being fed into a signal processor such as a computer system (most likely equipped with a DAQ board) or other signal display device. The position of laser peening head 16 may be manually controlled or automated by controller 52. For example, a real-time, closed-loop feedback system may be utilized to maintain a constant distance between tubular 22 and laser peening head 16. Distance data may be provided, for example, by sensor 40. In some embodiments, the results could be displayed on an output device for reference and monitoring purposes.

Cable 50, or the like, may include optic fibers to provide a laser beam delivery system connected between a laser 18 and laser peening head 16. Laser beam delivery system (e.g., cable 50) may include, without limitation, optic fibers, light tubes, mirrors, and combinations thereof. Cable 50 may be connected to power source 48 that is located outside of tubular 22. Laser 18 may be selected with a specific range of power density to accomplish a peening process on the type of material to be peened and generate the desired magnitude pressure wave required to achieve the desired attributes. In some embodiments, laser 18 may be located outside of tubular 22.

If deployed on a rig (e.g., drilling or workover), apparatus 10 may be inserted in tubular 22 via wireline, drill string, cables, air winch, top drive mounted tools, rollers, and the like. Top drive mounted tools include casing running tools, fill-up/cementing tools, and the like. If deployed at an onshore base, a member for inserting apparatus 10 into tubular 22 may be selected from rollers, cables, sleds, lances, and the like. If deployed on a J-lay tower, a member for inserting apparatus 10 into tubular 22 may be selected from cables, air winch, top drive mounted tools, rollers, cables, sleds, lances, and the like. When the member for inserting apparatus 10 into tubular 22 includes rollers, the rollers may be integral with apparatus 10.

According to some embodiments, treatment region 24 of a tubular may be laser shock peened to relieve tensile residual stresses resulting from the joining or manufacturing process, whether mechanical or metallurgical, and/or to introduce compressive residual stresses into the tubular. Tubular 22 may include treatment region 24 having deep compressive residual stresses imparted by laser shock peening that extends into the body. Deep compressive stress may be defined as compressive stresses that persist to a depth equal to or greater than 0.005 inches (0.0127 cm) into the material. Alternatively or in combination, tubular 22 may include treatment region 24 having been relieved, partially or completely, of residual tensile stresses by laser shock peening. Tubular 22 that have been partially relieved of residual tensile stress possess less residual tensile stress after peening than before. Tubular 22 that have been completely relieved of residual tensile stress would have essentially no tensile residual stress and may possess compressive residual stress as a result of the peening. The level of residual tensile stress before peening is determined by the manufacturing and/or joining processes and the associated effects.

In distinguishing laser peened tubular 22 from an unpeened tubular, various methods based on known techniques may be used. In one known technique, upon close inspection, a slightly wavy appearance, on the order of 0.0005 in. (0.00127 cm) may be apparent on a laser peened surface. Thus, laser peened region 24 of tubular 22 surface may be detected. Process to confirm if a member has been peened include processes that are capable of quantifying residual stress, such as neutron diffraction, x-ray diffraction, and the hole-drilling method. The hole-drilling method is defined in ASTM E837. In this method, a strain gage rosette with varying patterns depending on application is mounted to the work piece. In the center of the rosette, there is, for lack of a better term, a bull's-eye through which a precision drilled hole is made. Being that the gage is mounted to the work piece, as the drill removes material and the residual stresses are relieved, the gage detects the relaxation strain. This is then converted to stress and can be plotted to give the residual stress profile.

It will be understood that when compressive stress is used to relieve tensile stress, one could say that compressive stress is the opposite or negative of tensile stress. The total depth to which one induces compressive stress and the magnitude of the stress will determine how much tensile stress is relieved and the resulting residual stress profile. The resulting profile from the surface to the total depth of the induced compressive stress can be approximated by subtracting the compressive stress profile from the tensile stress profile. This procedure may be applied when, for example, the tensile stresses persist to a depth not more than the depth to which one is capable of inducing compressive stress. In some cases, the profile below the maximum depth becomes more complicated to determine.

It will be understood that application to tubular 22 is an illustrative embodiment and not limiting. According to some embodiments, an element may include a body having at least one treatment region 24 that has been laser shock peened to increase the tensile strength of the body above that of the same body in an unprocessed state. According to some embodiments, an element may include a metallic body having a region that has been laser shock peened to induce a metallurgical phase change.

It will be understood that when the element is not tubular, the metallic element may or may not be composed of steel. The process parameters may vary in accordance with the material characteristics of the laser peened element. According to some embodiments, the present invention provides a method for treating a metallic body. The method may involve relieving the tensile residual stresses or inducing compressive residual stresses in a metallic body. The method may involve increasing the tensile strength of the metallic body. The method may involve increasing any one or more of fatigue resistance, fracture toughness, fatigue life, strength, tensile strength, yield strength, corrosion resistance, hardness, resistance to weld cracking, and anti-galling ability.

A method for laser shock peening a metallic member is now described with reference to FIG. 1. A treatment region 24 is identified on a metallic member, which is illustrated as tubular 22 in FIG. 1. The treatment region may include a joint 28 wherein two members are interconnected. Apparatus 10 is positioned proximate to the selected treatment region 24. In the embodiment of FIG. 1, apparatus 10 is set in an initial position having a cross-sectional diameter less than the inside diameter of tubular 22. Apparatus 10 is then disposed into bore 20 of tubular 22 proximate to treatment region 24. It is noted that treatment region may be positioned a significant distance from an open access into tubular 22, for example, thirty feet or more.

Apparatus 10 may be actuated to engage a portion of tubular 22 to stabilize apparatus within tubular 22. For example, engagement members 14 may be expanded into engagement with tubular 22. In some embodiments, engagement members 14 may seal across tubular 22.

Laser peening head 16 may be positioned a desired distance from treatment region 24. Articulating arm 34 may be utilized to properly space and orient laser peening head 16 relative to treatment region 24. An ablative material may be applied to treatment region 24. The ablative material may be an opaque material, such as, but not limited to, black paint or tape. A layer of transparent material may be applied to the selected treatment region 24. The transparent material may be water or any other material that is translucent to coherent laser radiation.

Coherent laser radiation 32 may be emitted from laser peening head 16 against treatment region 24 to laser shock peen member 22. Laser shock peening may increase the tensile strength of member 22 to a second tensile strength that exceeds the first tensile strength of the member prior to laser shock peening. The LSP method may increase the tensile strength as a result of increasing compressive stress.

Laser peening head 16 may be rotated relative to member 22 and longitudinal axis Y while laser peening member 22. In some embodiments, laser peening head 16 rotates with a rotating base 12 and in other embodiments laser peening head 16 rotates about base 58. Laser peening head 16 may also be moved axially, in some embodiments, along longitudinal axis Y while laser shock peening.

In some embodiments, the LSP method may induce a metallurgical phase change in a metallic material. For example, the metallic member may be provided with a region in a metastable metallurgical state at ambient conditions. The ablative material coating and transparent material may be applied to the metallic member, if necessary. When the laser peening step is performed, the metallic member is induced into a metallurgical phase change. A metallurgical phase change is a transition from one microstructural constituent to another, such as the decomposition of austenite ($\gamma$-Fe) to ferrite ($\alpha$-Fe). Metallurgical state is the current condition of a metal including its microstructural constituents (phases), stability, phase compositions, internal stress/strain, etc. Metastable indicates a material in a state of pseudoequilibrium that has been partially stabilized (kinetically), but has a free energy higher than that of the true equilibrium state. Applying energy to such a material, whether it be deformation or heat, could cause the material to enter its true equilibrium state. For example, transformation induced plasticity (TRIP) steels and shape memory alloys may be examples of such materials.

While the LSP method discussed herein provides an illustrative embodiment, LSP methods are in no way limited to the specific steps discussed herein. In other embodiments, additional steps may be included. For example, when chasing cracks in components to be weld repaired, the crack may grow as excavation continues. To arrest the crack, a LSP method for treating the component may include excavating to a certain depth and laser peening the cavity before excavating further as necessary.

To selectively increase the apparent strength of a component, a method may include laser peening regions of high stress to increase the apparent strength of the material to achieve a higher load rating. Benefits of the process may include using less expensive materials, saving weight, optimizing performance, increasing fatigue resistance, increasing resistance to erosion, and the like. An example of a component that may be treated by such a method is a pipe elbow.

Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. An apparatus for laser shock peening a treatment region of a metallic member, comprising:
    a base oriented along a longitudinal axis, in use the base disposed in a bore of the metallic member;
    an engagement member connected to the base and actuable to radially expand in use to circumferentially engage a surface of the metallic member; and
    a laser peening head disposed with the base in use to emit laser radiation against a treatment region of the metallic member, the laser peening head moveable relative to the longitudinal axis.

2. The apparatus of claim 1, further comprising a driver in connection with the laser peening head to rotate the laser peening head about the longitudinal axis.

3. The apparatus of claim 2, wherein the driver rotates the base.

4. The apparatus of claim 1, wherein the laser peening head is axially moveable along the longitudinal axis.

5. The apparatus of claim 1, further comprising an arm interconnecting the laser peening head and the base.

6. The apparatus of claim 5, wherein the arm moves the laser peening head radially relative to the longitudinal axis.

7. The apparatus of claim 1, wherein the engagement member is an inflatable member.

8. The apparatus of claim 1, wherein the engagement member comprises opposing engagement members spaced apart by the base, wherein the laser peening head is located between the opposing engagement members.

9. The apparatus of claim 1, further comprising a sensor disposed proximate to the laser peening head in use to detect a distance to the metallic member.

10. The apparatus of claim 1, further comprising a transparent overlay applicator disposed with the laser peening head in use to apply a translucent coating to the treatment region.

11. The apparatus of claim 1, further comprising an opaque overlay applicator supported by the base in use to apply an ablative coating to the treatment region.

12. An apparatus for laser shock peening a tubular from the bore of the tubular, the apparatus comprising:
    a base oriented along a longitudinal axis, in use the base disposed in the bore;
    opposing engagement members spaced apart by the base, the opposing engagement members radially expandable in use to circumferentially engage an inner surface of the tubular;
    a laser peening head disposed with the base between the opposing engagement members, the laser peening head moveable relative to the longitudinal axis, in use the laser peening head to emit laser radiation against a treatment region of the metallic member;
    an opaque overlay applicator disposed with the base; and
    a transparent overlay applicator disposed with the base.

13. The apparatus of claim 12, wherein the engagement members comprise inflatable members.

14. The apparatus of claim 12, comprising a sensor disposed proximate to the laser peening head in use to detect a distance to the metallic member.

15. The apparatus of claim 12, comprising a driver in connection with the laser peening head to rotate the laser peening head about the longitudinal axis.

16. A method for laser shock peening a tubular, comprising:
- disposing a laser peening apparatus into a bore of the tubular, the laser peening apparatus comprising a base oriented along a longitudinal axis and a laser peening head;
- expanding an engagement member radially from the longitudinal axis into circumferential engagement with an inner surface of the tubular;
- positioning the laser peening head proximate to the inner surface of the tubular corresponding to a treatment region; and
- emitting laser radiation from the laser peening head directed at the treatment region.

17. The method of claim 16, further comprising rotating the laser peening head along the circumference of the inner surface while emitting the laser radiation.

18. The method of claim 16, further comprising moving the laser peening head axially relative to the tubular while emitting the laser radiation.

19. The method of claim 18, further comprising rotating the laser peening head along the circumference of the inner surface while emitting the laser radiation.

20. The method of claim 16, wherein the laser peening apparatus comprises:
- an opaque overlay applicator disposed with the base; and
- a transparent overlay applicator disposed with the base.

21. The method of claim 16, further comprising measuring a distance between the laser peening head and the treatment region via a sensor.

22. The method of claim 16, wherein the tubular comprises a first tubular and a second tubular interconnected at a joint, wherein the treatment region comprises the joint.

23. The method of claim 16, wherein the joint is a weld joint.

24. The method of claim 16, wherein the expanding the engagement member comprises expanding opposing spaced apart engagement members, wherein the laser peening head is disposed between the opposing engagement members.

\* \* \* \* \*